June 30, 1959
R. S. STADDEN
2,892,638
PLAY HAND CAR WITH INTERCONNECTED STEERING AND PROPELLING MEANS
Filed June 6, 1957
2 Sheets-Sheet 1
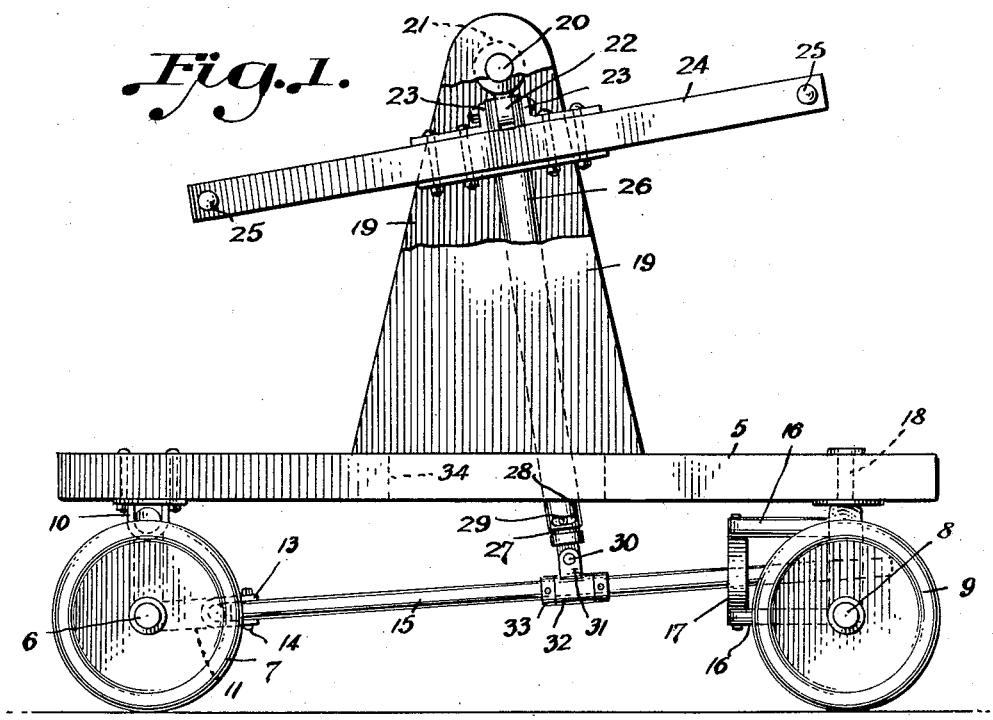
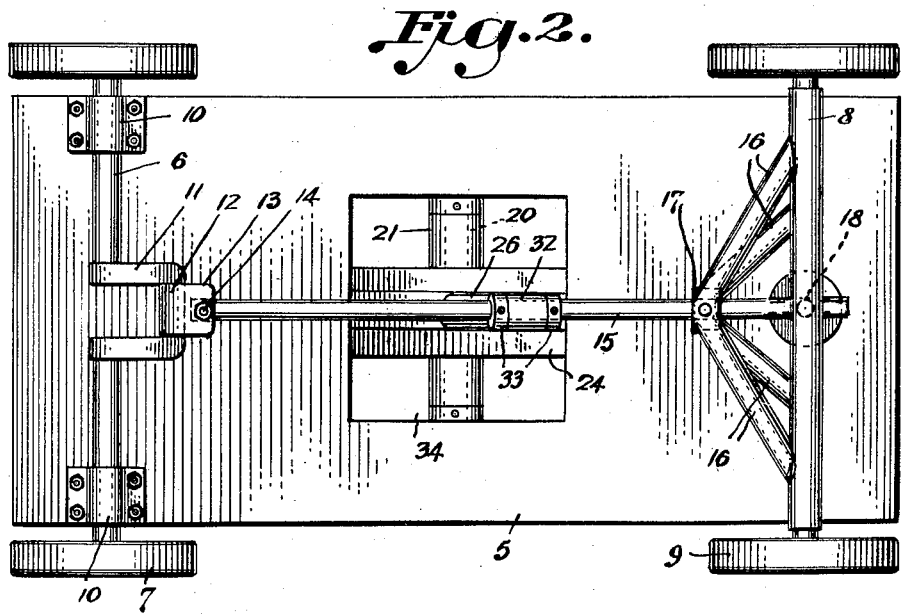
INVENTOR.
Richard S. Stadden,
BY
ATTY.

June 30, 1959
R. S. STADDEN
2,892,638
PLAY HAND CAR WITH INTERCONNECTED STEERING
AND PROPELLING MEANS
Filed June 6, 1957
2 Sheets-Sheet 2
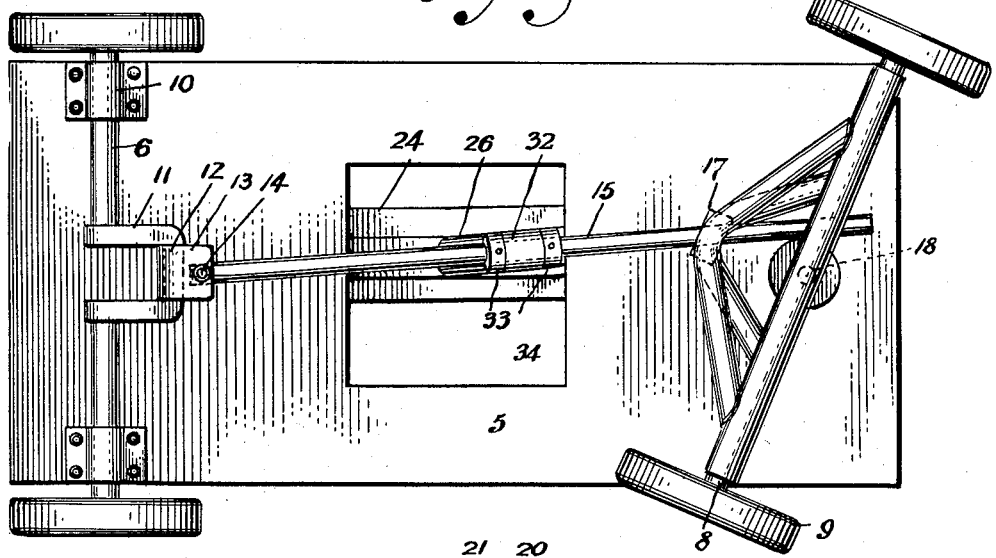
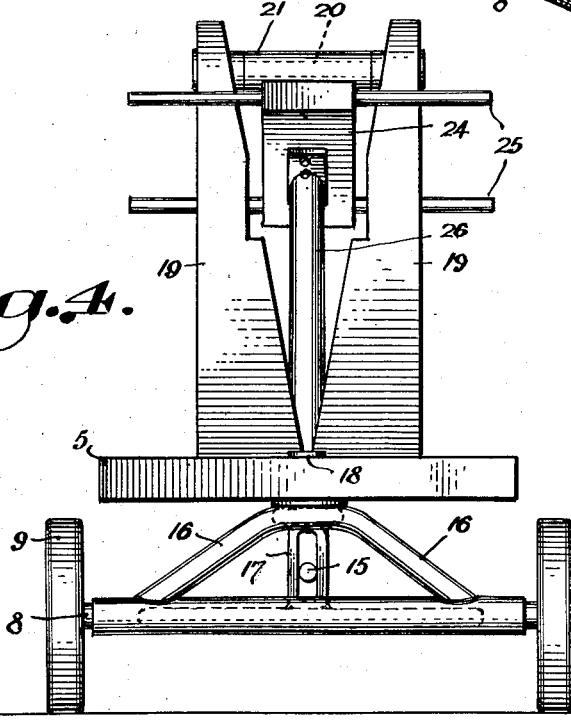
INVENTOR.
Richard S. Stadden,
BY
ATTY.

United States Patent Office 2,892,638
Patented June 30, 1959

2,892,638

PLAY HAND CAR WITH INTERCONNECTED STEERING AND PROPELLING MEANS

Richard S. Stadden, Los Angeles, Calif.

Application June 6, 1957, Serial No. 664,097

5 Claims. (Cl. 280—231)

This invention is a play hand car designed particularly for the use of children, or as a transport vehicle in factories.

The primary object of the invention is to provide a vehicle having the usual propelling and steering wheels, wherein the propelling movement for the vehicle is developed from mechanism mounted upon the vehicle and capable of being operated by a pumping or oscillating movement and embodying means whereby the pumping or oscillating element is capable of such movement as will bring about steering operations for the vehicle.

A further object of the invention is to provide a vehicle of light weight and of simple construction and capable of easy operation to bring about propelling movement of the vehicle, coupled with improved mechanism in connection with the propelling means whereby the vehicle may be accurately steered by the operators without resort to special and separate means for bringing about such steering actions.

A further object of the invention is to provide improved mechanism for propelling the vehicle by easy operations and providing improved steering mechanism associated with the propelling means to enable the occupants or operators of the vehicle to readily and easily steer the vehicle during the propelling operations.

A still further object is to provide a vehicle of the character and for the purposes generally stated which is of extremely simple construction, which involves comparatively few simple and readily assembled parts, which parts are so constructed and associated with one another as to minimize the opportunity for wear, breakage or derangement, which has its parts so assembled and related with respect to one another as to enable children without special training or instruction to operate the same effectively and accurately in both propelling and steering the vehicle.

With the foregoing objects in view, together with others which will appear as the description proceeds, the invention resides in the novel construction, combination and arrangement of parts, all as will be described more fully hereinafter, illustrated in the drawings, and particularly pointed out in the claims.

In the drawings:

Fig. 1 is a side elevation, parts broken away, of an amusement vehicle constructed in accordance with the invention, Fig. 2 is a bottom plan view of the device illustrated in Fig. 1, Fig. 3 is a view similar to Fig. 2 and showing the position of parts when the steering apparatus is moved in one direction, and Fig. 4 is a front elevation of the vehicle.

The vehicle of the present invention is constructed to simulate the well known hand car commonly used in connection with railways and wherein the vehicle is propelled by oscillating movements of a walking beam pivotally mounted upon the vehicle and to be operated by operators at either one or both ends of the beam. The structure here involved is for use for travel upon the ground, and is equipped with the walking beam type of propulsion mechanism, which mechanism has associated therewith means whereby the vehicle may be accurately steered by lateral oscillations of the walking beam.

Referring now more particularly to the drawing, the vehicle comprises essentially a body or platform indicated at 5 which may be of suitable length and breadth. This platform in the present instance is flat and of rectangular shape, having a supporting and propelling axle 6 rotatably mounted at its rear ends and carrying the drive wheels 7, and a front or steering axle 8 having supporting wheels 9 affixed to the ends thereof. The rear axle is mounted in the bearings 10, and is provided inwardly of its ends with a crank 11. This crank is provided with a sleeve 12 having forwardly projecting and horizontally disposed arms 13 between which is pivoted by the bolt 14 the rear end of a propelling shaft 15.

The front or steering axle 8 is provided with spaced parallel arms 16 projecting rearwardly of the axle and connected at their rear extremities by an upstanding yoke 17. When the front axle 8 is in true parallelism with the rear axle 6, the yoke 17 will be in true longitudinal alignment with the crank sleeve 12, and the power shaft 15 extends forwardly from its pivotal support 14 snugly through the yoke 17. The front axle is pivoted midway its ends as at 18 to the forward end of the platform 5.

From this construction it is apparent that forward and rearward longitudinal movement applied to the power shaft 15 will, through the crank mechanism, cause the drive shaft 6 to rotate thus moving the vehicle in either forward or rearward direction. The power shaft 15 is sufficiently long to permit of these movements without becoming disengaged from the yoke 17. The pivot 14 at the rear end of the power shaft 15 enables the said shaft to swing laterally of the vehicle, which movements are transmitted in lateral directions to the yoke 17 causing the front axle 8 to swing upon its pivot or kingpin 18 as will be understood.

Mounted in spaced relationship in upstanding position upon the platform 5 and at the mid-portion thereof are stanchions or supports 19. These supports are connected at their upper ends by a transversely disposed pin 20 upon which is rotatably mounted a rocker sleeve 21. This sleeve is provided with a depending lug 22 to which is pivotally mounted as at 23 the mid-portion of a walking beam or rocker arm 24; this pivotal connection permitting oscillations of the walking beam transversely of the vehicle. The free ends of the rocker bar may be provided with transversely disposed handles 25 to be engaged by the hands of the vehicle operator.

The mid-portion of the walking beam 24 has rigidly connected thereto the upper end of a post 26, the lower end of which is socketed to receive the upper end of a connecting pin 27. The side of the socketed end of the post 26 is provided with a lateral groove or opening 28 to receive a key 29 projecting from the pin 27 to permit slight oscillations of these parts with respect to one another. The pin 27 is pivotally connected as at 30 to an upstanding lug 31 formed upon a sleeve 32 rotatably embracing the shaft 15 and held against longitudinal movement upon said shaft by the locking rings 33.

From this construction it will be apparent that oscillations of the walking beam or rocker 24 upon its pivot 20 will cause the post 26 to move as a pendulum through the opening 34 in the platform 5, carrying with it the shaft 15 attached at its rear end to the crank 11. This brings about propulsion of the vehicle. When it is desired to steer the vehicle from a straight course, the operators will oscillate the walking beam upon the pivot 23, bringing about swinging of the post 26 laterally of the vehicle. This action may be brought about without cessation of the impelling oscillations of the walking beam. When the lateral oscillatory movement is applied to the walking beam to the right, as viewed in Fig. 4, the forward end of the propelling shaft 15 will be carried thereby, causing the yoke 17 to turn the front axle upon its pivot 18 so as to move the steering wheels to the left. A reverse of this movement will bring about a reversal of movement of the steering axle as will be obvious.

From the foregoing it is apparent that I have provided a manually operated vehicle capable of being propelled from the body of the vehicle by the walking beam and which beam may be oscillated when desired by the operators to bring about accurate and positive steering operations of the vehicle without the necessity of relaxing the propelling operations. The propelling means here illustrated involves crank means upon the drive shaft but it will be understood that any other preferred means may be employed for imparting driving action to the rear axle by means of horizontal reciprocations of the power shaft 15.

I claim:

1. In a play hand car, a platform, a drive axle supporting one end of said platform, a crank in said axle, a steering axle pivoted for horizontal swinging movement inwardly of its ends beneath the opposite end of said platform, a steering yoke affixed in upstanding position to said steering axle, a shaft pivotally connected at one end to said crank and capable of swinging movement laterally and vertically of said platform, the opposite end of said shaft extending through said yoke, a rocker sleeve pivotally mounted above said platform for swinging movement longitudinally thereof, a rocket pivoted to said sleeve for oscillation laterally thereof, a post affixed to said rocker and depending therefrom, a sleeve rotatably mounted on said shaft, and a pivot conecting said post to said sleeve.

2. In a play hand car, a body, a drive axle supporting one end of said body, a crank in said axle, a steering axle pivoted transversely of the opposite end of said body for swinging movement in a horizontal plane, a steering yoke affixed to said steering axle inwardly of its ends and rearwardly of said steering axle, a shaft pivoted for universal movement at one end to said crank and extending at its opposite end through said yoke, a rocker pivoted midway its ends upon said body and capable of lateral swinging movement, a post affixed to said rocker at one end, and universal pivot means connecting the opposite end of said post with said shaft.

3. In a play hand car, a platform, a drive axle supporting one end of said platform, a crank disposed centrally in said axle, a steering axle pivoted for horizontal swinging alignment inwardly of its ends beneath the opposite end of said platform and in longitudinal alignment with said crank, a steering yoke affixed in upstanding position to said steering axle rearwardly of the latter, a shaft pivotally connected at its rear end to said crank and capable of swinging movement laterally and vertically of said platform, the forward end of said shaft extending through said yoke, a rocker sleeve pivotally mounted above said platform for swinging movement longitudinally thereof, a rocker pivoted to said sleeve for oscillation laterally thereof, a post affixed to said rocker and depending therefrom, a sleeve rotatably mounted on said shaft and fixed against longitudinal movement thereof, and a pivot connecting said post to said sleeve.

4. In a play hand car, a platform, a drive axle supporting one end of said platform, a crank in said axle midway the ends thereof, a steering axle pivoted for horizontal swinging movement inwardly of its ends beneath the opposite end of said platform, a steering yoke affixed in upstanding position to said steering axle rearwardly thereof and in longitudinal alignment with said crank, a crank sleeve rotatably mounted on said crank, arms projecting forwardly from said sleeve, a power shaft having its rear end disposed between said arms, a pivot connecting said shaft end to said arms to permit the said shaft to swing laterally of said platform, the forward end of said shaft extending through and confined within said yoke, a pair of stanchions arranged in spaced parallelism upon said platform, a shaft disposed laterally of said vehicle and connecting the upper ends of said stanchions, a rocker sleeve rotatably mounted upon said shaft, a lug depending from said sleeve and disposed laterally of said vehicle, a rocker arm disposed beneath said sleeve and pivotally connected to said lug for lateral swinging movements thereof, a post secured to and depending from said rocker midway the ends thereof, a pin mounted within the lower end of said post, said post having a lateral slot therein permitting limited rotation of the pin, a key affixed to said pin and extending through said slot, a sleeve loosely embracing said power shaft, collars affixed to said shaft to hold said sleeve against longitudinal movement thereof, and a lug projecting upwardly from said sleeve and pivotally connected to said pin.

5. In a hand car structure, a body, a drive axle supporting one end of said body, a crank in said axle, a steering axle pivoted at the opposite end of said body for swinging movement in a horizontal plane beneath the same, a steering yoke affixed to said steering axle in upright position rearwardly of said steering axle, a shaft pivoted at one end to said crank for swinging movement in horizontal as well as vertical planes beneath said body and with its forward end engaged in said yoke, a rocker pivoted midway its ends upon said body for vertical as well as horizontal oscillations, a post secured at its upper end to said rocker and depending therefrom, a sleeve rotatably mounted on said shaft and held against movement longitudinally thereof, and a connection between the lower end of said post and said sleeve.

References Cited in the file of this patent

UNITED STATES PATENTS

| | | |
|---|---|---|
| 1,387,281 | McCarthy et al. | Aug. 9, 1921 |
| 1,620,926 | Trullinger | Mar. 15, 1927 |
| 1,723,553 | Lundahl | Aug. 6, 1929 |
| 1,787,322 | Pugh | Dec. 30, 1930 |